United States Patent [19]

Bettinger

[11] Patent Number: 5,188,260
[45] Date of Patent: Feb. 23, 1993

[54] DISPENSING DEVICE HAVING A WALL MADE FROM A SHRINK PLASTIC MATERIAL

[76] Inventor: David S. Bettinger, 8030 Coventry, Grosse Ile, Mich. 48138

[21] Appl. No.: 709,219

[22] Filed: Jun. 3, 1991

[51] Int. Cl.$^5$ ............................................. B65D 35/28
[52] U.S. Cl. ..................................... 222/95; 222/107; 222/146.5; 222/154; 174/DIG. 8; 428/34.9; 428/35.1
[58] Field of Search .......................... 222/52, 54, 95, 92, 222/107, 146.5, 386.5, 386, 610, 158, 154, 325; 174/DIG. 8; 428/34.9, 35.1

[56] References Cited

U.S. PATENT DOCUMENTS

| | | | |
|---|---|---|---|
| 3,091,243 | 5/1963 | Gruida | 222/146.5 X |
| 3,734,348 | 5/1973 | White | 222/54 X |
| 4,075,098 | 2/1978 | Paul et al. | 210/168 |
| 4,500,371 | 2/1985 | De Groot | 174/DIG. 8 |
| 4,692,151 | 9/1987 | Blackman | 604/132 |
| 4,732,191 | 3/1988 | Visser et al. | 222/54 X |
| 4,747,711 | 5/1988 | Motta et al. | 400/196.1 |
| 4,832,248 | 5/1989 | Soni et al. | 174/DIG. 8 X |
| 4,886,144 | 12/1989 | Wengeler | 174/45.1 |
| 4,899,910 | 2/1990 | Tabei et al. | 222/146.5 X |
| 4,915,139 | 4/1990 | Landry et al. | 138/125 |
| 4,990,380 | 2/1991 | Jensen et al. | 428/34.9 |
| 5,006,286 | 4/1991 | Dery et al. | 174/DIG. 8 X |
| 5,088,623 | 2/1992 | Crawford | 222/40 |

OTHER PUBLICATIONS

*Modern Plastics Encyclopedia*, vol. 63, No. 10A, p. 792.
The application of Centralized Lubrication Systems to Mobile Equipment, Bill Mueller, 1975, SAE #750585.

Primary Examiner—Kevin P. Shaver
Assistant Examiner—Kenneth DeRosa

[57] ABSTRACT

Device for delayed dispensing of viscous liquids in which the plastic material of the dispensing container is selected for its ability to shrink in a predictable manner upon exposure to heat, age, light, or chemical activator; and the container shape and dimensions are selected to render the proper evacuation pressure according to the volume and viscosity of the charge to be dispensed. In various embodiments of the invention the shrink induced dispenser is used to dispense lubricants, inks, additives, and medications. In heat activated embodiments the inventiuon is capable of integral temperature responsive automatic flow control.

10 Claims, 1 Drawing Sheet

DISPENSING DEVICE HAVING A WALL MADE FROM A SHRINK PLASTIC MATERIAL

BACKGROUND OF THE INVENTION

1. Field of the Invention

The present invention is directed in general to the dispensing of viscous liquids and in particular to the ability of particular plastics to shrink thereby creating a volumetric reduction in a container made of said plastic which induces a flow of the charge.

This invention also relates to delayed dispensing. Non-immediate dispensing is often required for lubricants for lubrication of fixed and mobile equipment, inks for re-inking of printer ribbons, additives for replenishment of lubricant additives, or medications for ambulatory drug maintenance. Lubricant dispensing units may be independent or tied to a central control system.

2. Description of the Prior Art

This invention employs the ability of various plastics which shrink either due to form memory, polymerization, or chemical action. Heat activated, form memory plastics which have been fabricated into film, sheets, or tubing are widely used in packaging, assembly, and electrical connections. Other uses include encapsulation disclosed in U.S. Pat. No. 4,915,139, and a *Self-Extinguishing Cigarette* disclosed in U.S. Pat. No. 3,091,243.

It is the general object of this invention to provide a simple, reliable, inexpensive shrink induced dispenser where immediate application of the charge to be dispensed is either untimely, inconvenient, hazardous, or inaccessible.

This invention teaches that shrink induced dispensing can be utilized for a variety of charge viscosities by varying the dimensions of the container. For example viscous liquids can be displaced by the shrinkage of thick walled, small diameter tubes. Low viscosity liquids can be displaced by thin walled containers.

This invention teaches that shrink induced dispensing can be activated by a variety of means by varying the container's plastic material. The *Modern Plastics Encyclopedia*, Volume 63, Number 10A, page 792 lists ten plastics used in shrink tubing supplied by twenty-nine companies. The predominate shrink plastics in current use are heat activated, form memory polymers. Plastic materials exist which shrink under conditions of aging, polymerization, light, exposure to air, or chemical action. Thereby, a variety of applications can be served by a plastic selection which corresponds to the desired mode of dispensing in terms of activation method, time interval of delay, and duration period of dispensing.

Automotive centralized lubrication in the prior art is a complex method of lengthening maintenance intervals. All the systems shown in *The Application of Centralized Lubrication Systems to Mobile Equipment*, SAE #750585, require a pump. The use of electrical resistance heating to activate heat shrink induced lubricant dispensing eliminates the pump. Dispensing is aided by the heat being applied to the charge, thereby improving the flow of a viscous charge. A heat activated grease dispenser when insulated can function at lower ambient temperatures than the prior art. Thus, it is a more particular object of this invention to provide an inexpensive dispensing element for multi-outlet dispensing systems.

Further, this invention teaches that shrink induced dispensers can eliminate a dispensing controller by making the controller integral with the flow inducing member. U.S. Pat. No. 4,886,144 discloses a *Lubricating Apparatus for Bearings*. This is an example of the prior art wherein a spring induced dispenser is a separate member from it's temperature control. During operation a machinery bearing may heat in the absence of lubrication. Such heat when transmitted to a lubricant charged, heat activated, shrink induced dispenser can automatically dispense on a demand basis. Lubricant use can be optimized in the absence of a unified system or external control by the invention's temperature responsive automatic flow control. Thereby, this invention can also supply fall-back lubrication which is heat activated if routine lubrication is omitted.

After use, printer ribbon within a cartridge may require re-inking. U.S. Pat. No. 4,747,711, *Cartridge for an Inked Ribbon with a Re-inking Device*, discloses an ink charged reservoir discharge by wick action. A shrink induced dispenser which has a container that is activated by exposure to air can provide delayed reinking in parallel with ink usage as the recycled ribbon carries ambient air into the cartridge.

Automotive engine crankcase lubricants often require replenishment of their additives after a defined period in operation. U.S. Pat. No. 4,075,098, *Masking Elements for Dissolving Oil Improving Body in an Oil Filter*, discloses a way of delaying the dispersal of these additives from a source body within an oil filter canister. This delayed dispensing of chemical additives can be more easily accomplished by a shrink induced dispenser selected to age shrink within the ambient conditions of engine oil. The inexpensive nature of shrink tubes allows for the segregation of incompatible additives within separate dispensers. Thus, another object of this invention is independent, integral, automatic delayed dispensing over a period of months to extend the useful life of disposable or recyclable components.

Medical prior art includes a number of devices for infusing a drug to an ambulatory patient. U.S. Pat. No. 4,692,151, *Parenteral Fluid Medication Reservoir Pump*, discloses two pumpless methods for induced flow, either by balloon depletion or by expansion of a compressed gas. Such pressurized systems tend to dissipate during storage and have no delayed discharge ability. An infuser for an ambulatory patient using the pumpless dispensing ability of a shrink induced dispenser has storage integrity and an activation delay period selected to conform to the medication charge. Thus, another object of this invention is delayed automatic ambulatory medication.

BRIEF DESCRIPTION OF THE DRAWINGS

The invention, together with additional objects, features and advantages thereof, will be best understood from the following description, the appended claims and the accompanying drawings in which:

DESCRIPTION OF THE PREFERRED EMBODIMENT

Figure 1:
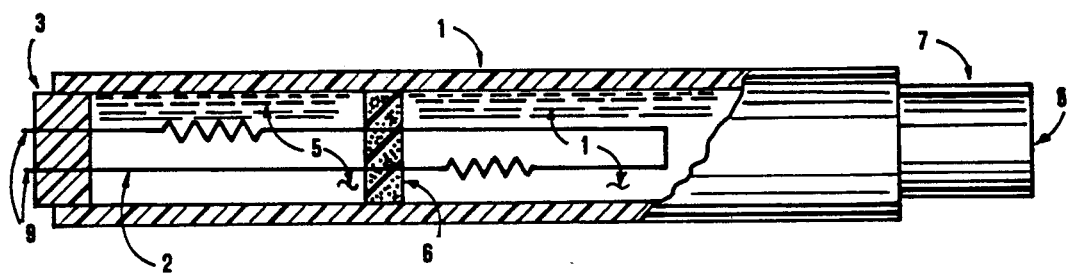
FIG. 1 is a partial section through a fore-shortened shrink evacuated, viscous liquid dispenser showing the internal arrangement of components of the preferred embodiment of the invention.

FIG. 1 illustrates the preferred embodiment of this invention as a lubricant dispenser for fixed or mobile equipment comprising a tube container 1 possessing at least one outlet, being made of a shrink plastic material. Within said heat shrink plastic tube 1 is mounted a resistance heating wire 2, said wire being mounted in means for an end closure 3. Within said shrink tube 1 is a viscous liquid lubricant charge 4, and an inert follower fluid 5 of sufficient volume to fill the void in tube 1 when tube 1 has reached its shrinkage limit, thereby economizing the charge. A movable compressible separator 6 serves to separate the charge 4 from the follower fluid 5.

A grease fitting 7 serves as a connector and a restraining valve to prevent the charge from premature dispensing. When installed the fitting 7 mates with a compatible fitting on the equipment to be serviced.

When an electric current is applied to the electrical leads 9 in the end closure 3, the resistance element 2 generates sufficient heat to cause the shrink tube 1 to reobtain its form memory. The resulting reduction in the interior volume of the shrink tube 1, induces a flow in the charge 4 and the eventual evacuation of said charge. As the charge 4 is evacuated the compressed follower fluid 5 forces the flexible separator 6 to move along the heating element wires 2 until the tube has reached its shrinkage limit and the separator has reached the limit of its travel toward the dispensing end 8 against the connective end fitting 7. A dye added as a component of the follower fluid and at least a portion of the container rendered translucent allows visual monitoring of the progress of the follower fluid toward total evacuation of the charge.

Figure 2:
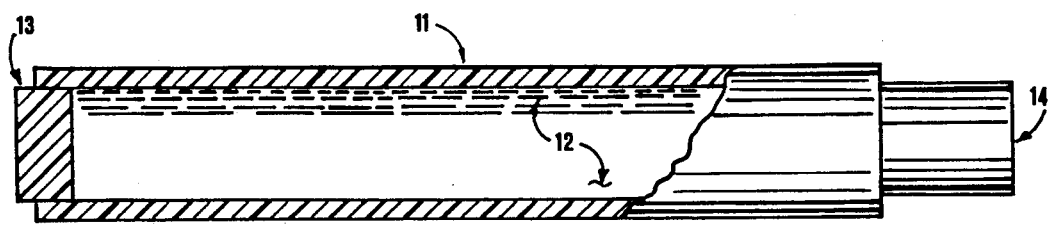
FIG. 2 is a partial fore-shortened section through a shrink evacuated, viscous liquid dispenser relating to a further embodiment of the device.

FIG. 2 illustrates a basic embodiment of this invention as an independent, automatic lubricant dispenser for a machinery bearing comprising a length of heat shrink plastic tube 11 and means for end closure 13. Although end closure is shown as being achieved by said closure member 13, a variety of closure means may be employed involving said shrink tube alone. Within said shrink tube 11 is a lubricant charge 12. A grease fitting 14 serves as a connector and a restraining valve to prevent the charge from premature dispensing. When installed said fitting 14 mates with a compatible fitting on a bearing.

If routine bearing lubrication is omitted, operating friction will heat a bearing. When the ambient temperature in close proximity to said bearing reaches the heat activation temperature of the shrink plastic tube 11, said tube 11 will reduce it's interior volume thereby inducing a flow in the charge 12. Thus, the bearing is safeguarded from failure.

It will be appreciated that the principles of shrink induced dispensing hereinabove disclosed find numerous applications in addition to the various embodiments illustrated in the drawings. For example, the independent delayed dispensing attribute of the invention finds application in the replenishment of additives in coolants and heat transfer fluids, the dispersal of chemicals in a closed reactor, the release of adhesives or sealants within a structure after assembly, the release of sanitizers and deodorants, and the release of fertilizers after planting.

The invention claimed is:

1. A dispensing device comprising:
   a container having a container wall;
   a flowable charge disposed within said container;
   said container having at least one closeable dispensing outlet through which said flowable charge is dispensed; and
   wherein said container wall is made of a shrink plastic material which when activated results in a reduction in the interior volume of said container forcing said flowable charge through said dispensing outlet.

2. The dispensing device of claim 1 wherein said dispensing outlet has a restraining valve to prevent said flowable charge from premature dispensing.

3. The dispensing device of claim 1 wherein said container holds an inert follower fluid which completely fills the container interior volume after said shrink plastic material has reobtained its form memory and said flowable charge has been dispensed.

4. The dispensing device according to claim 3 wherein said follower fluid comprises a de and wherein said container wall is translucent for visual monitoring of the progress of said follower fluid toward total evacuation of said flowable charge.

5. The dispensing device of claim 1 wherein said shrink plastic material is activated by heat.

6. The dispensing device of claim 5 further comprising an end closure disposed on an end of said container opposite said dispensing outlet and a heat resistance heating wire being mounted within said end closure.

7. The dispensing device of claim 1 wherein said shrink plastic material is activated by aging.

8. The dispensing device of claim 1 wherein said shrink plastic material is activated by light.

9. The dispensing device of claim 1 wherein said shrink plastic material is activated by the presence of a chemical agent.

10. The dispensing device of claim 1 wherein said shrink plastic material is activated upon exposure to oxygen.

* * * * *